US006547128B1

(12) United States Patent
Shimura

(10) Patent No.: US 6,547,128 B1
(45) Date of Patent: Apr. 15, 2003

(54) HUB ODOMETER

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/480,621

(22) Filed: Jan. 10, 2000

(30) Foreign Application Priority Data

Jan. 12, 1999 (JP) ............................................. 11-005549

(51) Int. Cl.[7] .................................................. G01C 22/00
(52) U.S. Cl. ................................................... 235/95 B
(58) Field of Search ....................................... 235/95 B

(56) References Cited

U.S. PATENT DOCUMENTS

| | | | | |
|---|---|---|---|---|
| 4,680,454 A | * | 7/1987 | Zeaman et al. ........... 235/95 R |
| 4,697,278 A | * | 9/1987 | Fleischer ..................... 377/24 |
| 4,989,222 A | * | 1/1991 | Lutts et al. ................ 377/24.1 |
| 5,003,704 A | * | 4/1991 | Schubert .................... 235/95 B |
| 5,524,034 A | * | 6/1996 | Srygley et al. ................ 377/15 |
| 5,673,018 A | * | 9/1997 | Lowe et al. ................. 340/445 |
| 6,018,298 A | * | 1/2000 | Endo et al. ............. 340/572.5 |
| 6,230,556 B1 | * | 5/2001 | Malinowski ............... 73/146.2 |

* cited by examiner

Primary Examiner—Michael G. Lee
Assistant Examiner—Lisa M. Caputo
(74) Attorney, Agent, or Firm—Rader, Fishman & Grauer PLLC

(57) ABSTRACT

A hub odometer is disclosed, which includes: an eccentric weight rotably supported in a center axis position of an axle hub; a case attached to the axle hub to surround the eccentric weight; a non-contact measuring mechanism disposed to measure the number of revolutions in a relative relation to the case and the eccentric weight; and a transponder including a memory for storing measuring data of the measuring mechanism, a transmitting circuit for transmitting the data stored in the memory, and a receiver for receiving an interrogation wave from a remote unit, the transmitting circuit being actuated on the basis of the interrogation wave.

4 Claims, 5 Drawing Sheets

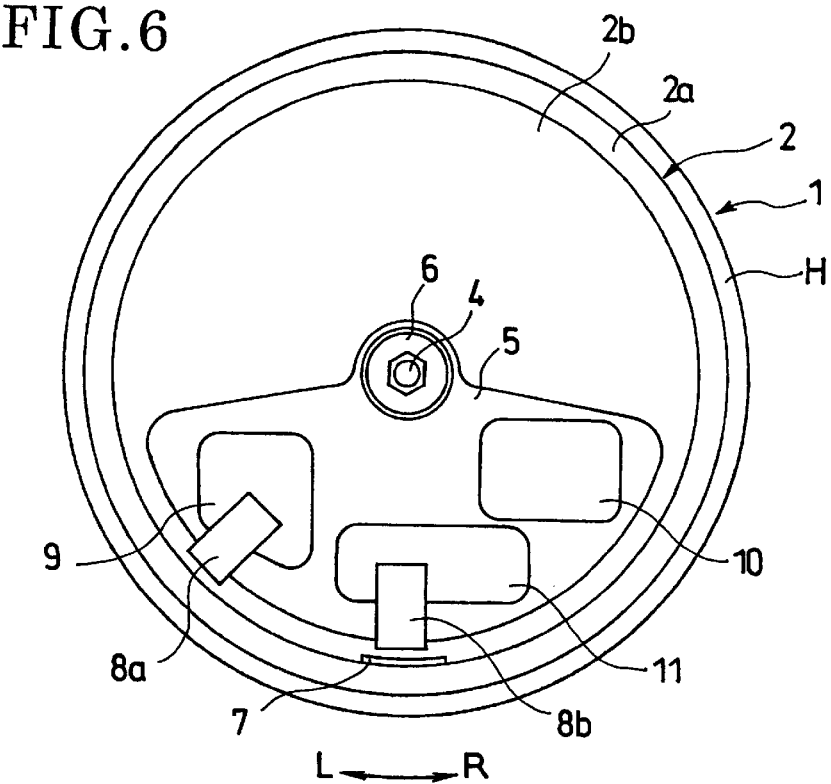
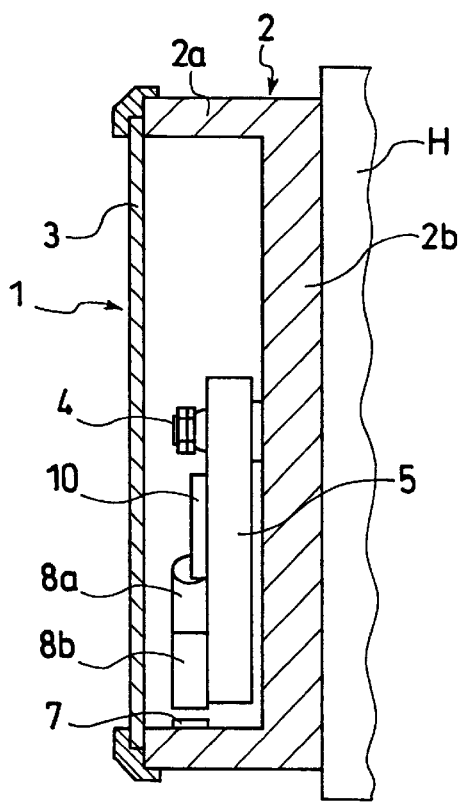

FIG.8(a) Rotation of R direction
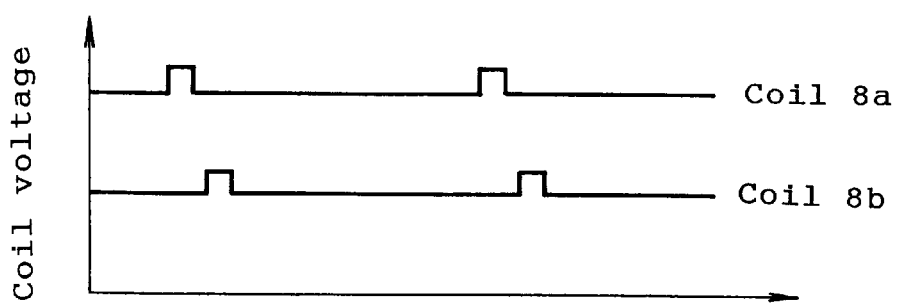
FIG.8(b) Rotation of L direction
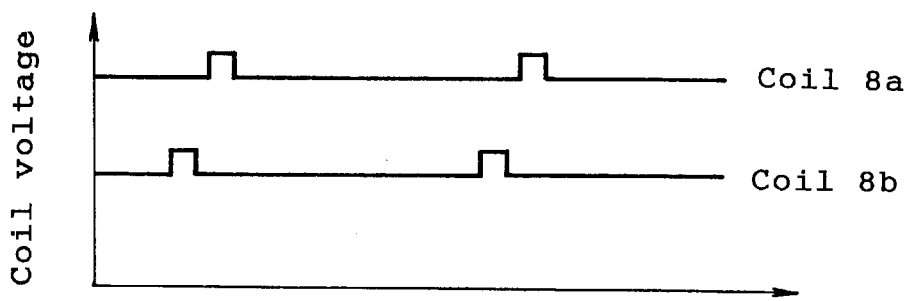

HUB ODOMETER

BACKGROUND OF THE INVENTION

The present invention relates to a hub odometer designed to measure a distance traveled by a trailer, an industrial vehicle or the like. More: particularly, the invention relates to a hub odometer capable of not only measuring a traveling distance accurately irrespective of a rotational direction of a vehicle wheel but also facilitating data management thereof.

In the case of a trailer, an industrial vehicle or the like, an odometer is attached to an axle and, in this axle portion, measuring is independently performed for a traveling distance. The attachment of such a hub odometer enables a distance traveled by a car body to be measured for example even when a car body of the trailer is detached from a driver's seat.

Heretofore, The hub odometer has been provided with a mechanism for mechanically measuring the number of revolutions by utilizing a gear or the like, thereby has displayed a traveling distance directly. However, in such a mechanical odometer, it is necessary to go to the axle area to visually read a traveling distance, and reading is difficult if the odometer is soiled. Therefore, there was a problem of complicated data management regarding traveling distances. In addition, in the mechanical odometer, a traveling distance is reduced when a rotational direction of the vehicle wheel is reversed against forward rotation. Thus, there was a problem of impossibility of measuring traveling distances accurately, especially in the case of the industrial vehicle frequently moved back and forth.

Furthermore, in U.S. Pat. No. 4,697,278, an electronic hub odometer was disclosed, which measures the number of revolutions by a magnetic reed switch, and transmits data of the measured result to a remote unit by flashing an infrared light emitting diode. However, if the odometer is soiled, it is difficult for the remote unit to detect the flashing of the light emitting diode. Thus, data management was neither accurate nor easy.

SUMMARY OF THE INVENTION

It is an object of the present invention to provide a hub odometer capable of accurately measuring a traveling distance irrespective of a rotational direction of a vehicle wheel, and facilitating data management thereof.

In order to achieve the foregoing object, a hub odometer of the present invention comprises: an eccentric weight rotably supported in a center axis position of an axle hub; a case attached to the axle hub to surround the eccentric weight; a non-contact measuring mechanism disposed to measure the number of revolutions in a relative relation to the case and the eccentric weight; and a transponder including a memory for storing measuring data of the measuring mechanism, a transmitting circuit for transmitting the data stored in the memory, and a receiver for receiving an interrogation wave from a remote unit, the transmitting circuit being actuated on the basis of the interrogation wave.

As described above, the non-contact measuring mechanism is used for measuring the number of revolutions of the axle hub, which becomes a reference for calculating a traveling distance. Accordingly, a traveling distance can be accurately measured irrespective of a rotational direction of a vehicle wheel. In addition, the transponder is provided to transmit measuring data of the measuring mechanism on the basis of an, interrogation wave from the remote unit. Accordingly, the measuring data can be displayed on an optional data management unit or the like, and the necessity of visually reading a traveling distance for each axle can be eliminated. Thus, data management can be facilitated.

The non-contact measuring mechanism can be composed of one of the following combinations: a magnet and a magnetic pickup coil; a projecting source, an optical sensor and a light shielding plate; the projecting source, the optical sensor and a reflector; a proximity sensor for detecting a change in a resonance frequency of a high-frequency magnetic field and a metallic piece for detection.

A single or a plurality of the measuring mechanisms may be provided. Especially, by shifting measuring positions of the plurality of measuring mechanisms from each other in a hub circumferential direction, a rotational direction of the vehicle wheel can be specified on the basis of measuring data thereof. Thus, data management correlating the rotational direction with a traveling direction can be performed.

BRIEF DESCRIPTION OF THE DRAWINGS

For a more complete understanding of the present invention and the advantages thereof, reference is now made to the following description taken in conjunction with the accompanying drawings.

FIG. 4(a) being a wave form chart, and FIG. 4(b) a binary wave form chart.

FIG. 6 is a front view showing a hub odometer of another embodiment of the invention.

FIG. 7 is a sectional view of the hub odometer shown in FIG. 6.

FIGS. 8(a) and 8(b) show coil voltages of a magnetic pickup coil (non-contact measuring mechanism) in the embodiment of FIG. 6: FIG. 8(a) being a binary wave form chart in the case of rotation of an R direction, FIG. 8(b) a binary wave form chart in the case of rotation of an L direction.

DETAILED DESCRIPTION OF THE PREFERRED EMBODIMENTS

Figure 1:
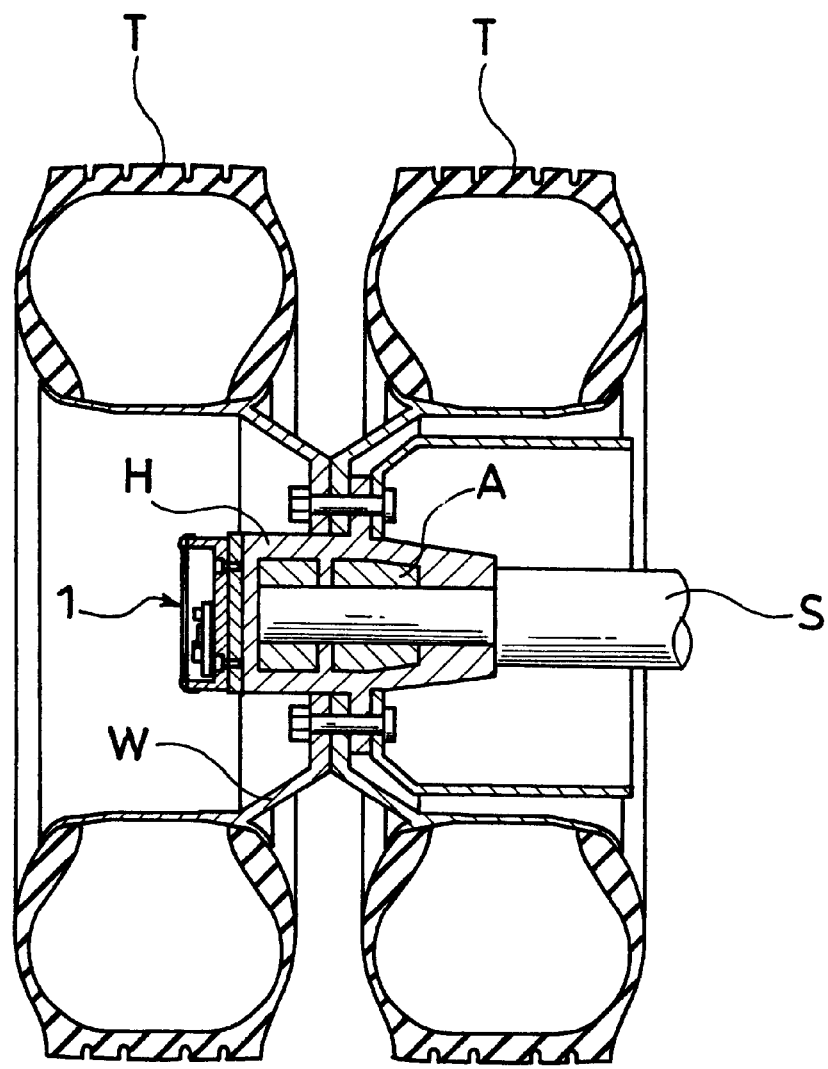
FIG. 1 is a sectional view illustrating a vehicle wheel, to which a hub odometer of an embodiment of the present invention is mounted.
Figure 2:
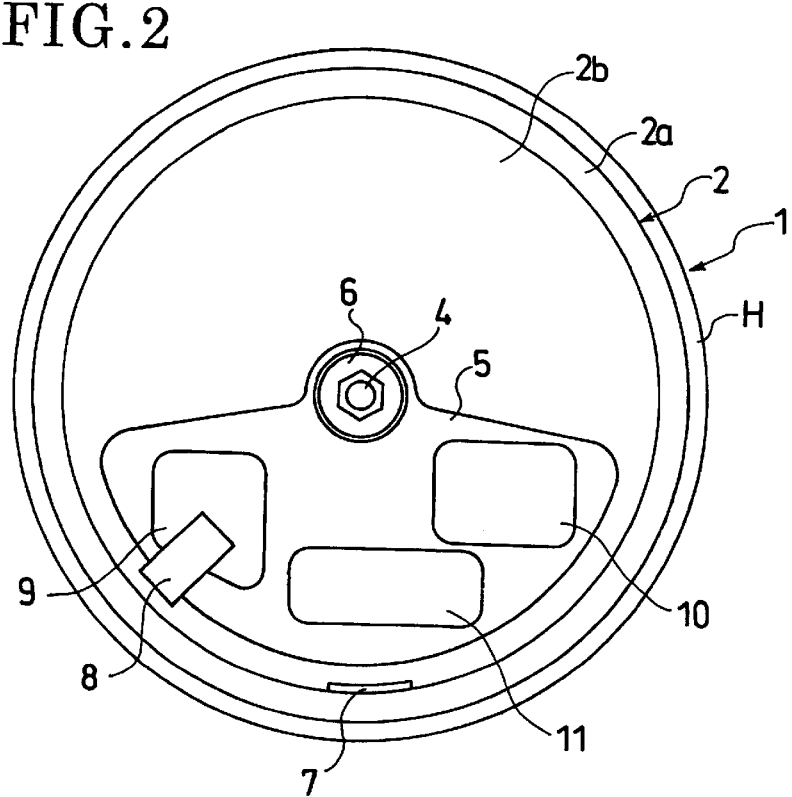
FIG. 2 is a front view showing the hub odometer of the embodiment of the invention.
Figure 3:
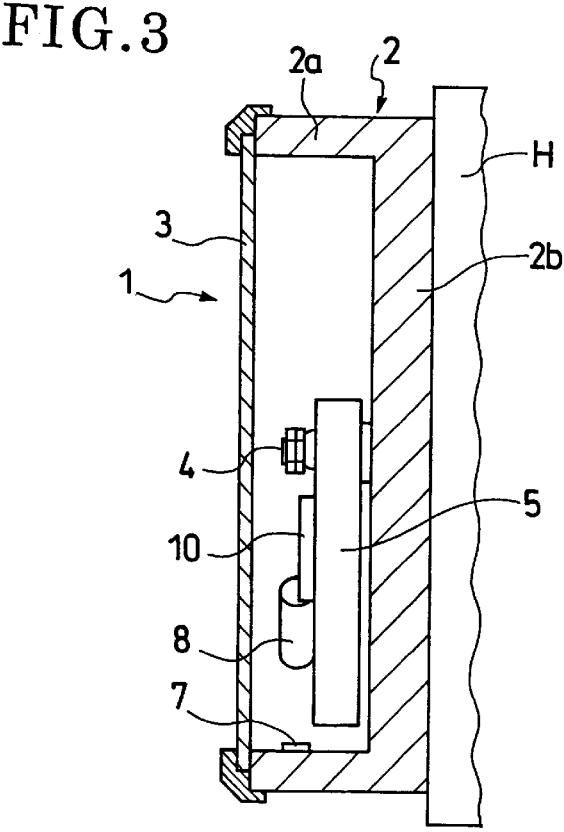
FIG. 3 is a sectional view of the hub odometer shown in FIG. 2.

FIG. 1 illustrates a vehicle wheel, to which a hub odometer of an embodiment of the present invention is mounted. FIGS. 2 and 3 show the hub odometer of the embodiment.

In FIG. 1, an axle hub H is rotably attached to an end of an axle S by interposing a bearing A therebetween. A flange is unitedly provided in the outer peripheral part of the axle hub H. Dual wheels W are fixed to the flange by bolts. On the dual wheels W, tires T respectively as inner and outer wheels are mounted.

An odometer 1 is attached to the axle hub H. As shown in FIGS. 2 and 3, a case 2 has a cylindrical portion 2a and a side portion 2b. The side portion 2b is fixed to the axle hub H by a bolt or the like. A freely detachable cover 3 is fitted to an open end of the cylindrical portion 2a.

In the side portion 2b of the case 2, a rotary shaft 4 is erected in the center axis position of the axle hub H. Around the rotary shaft 4, an eccentric weight 5 is rotably supported by interposing a bearing 6. Because of its eccentric structure, the eccentric weight 5 always maintains its drooped state from the rotary shaft 4 with its dead weight. A magnet 7 is attached to an inner peripheral surface of the case 2, and a magnetic pickup coil 8 is attached to the eccentric weight 5. The magnet 7 and the magnetic pickup coil 8 constitute a non-contact measuring mechanism for measuring the number of revolutions of the case 2 and the eccentric weight 5 relative to each other.

The eccentric weight 5 is loaded with a main circuit 9 including a memory (EEPROM) for storing measuring data from the magnetic pickup coil 8 and a transmitting circuit for transmitting the stored data of the memory, a receiver 10 including a high frequency circuit and an antenna, and a battery 11 for driving the main circuit 9 and the receiver 10. After the receiver 10 receives an interrogation wave from a remote unit, the transmitting circuit is actuated by this interrogation wave to transmit the measuring data as a response wave. The measuring data transmitted from the transmitting circuit can be displayed on an optional data management unit or the like. For the interrogation and response waves of a transponder, radio waves having radio frequencies of 10 kHz to 100 GHz are used.

Figure 4A:
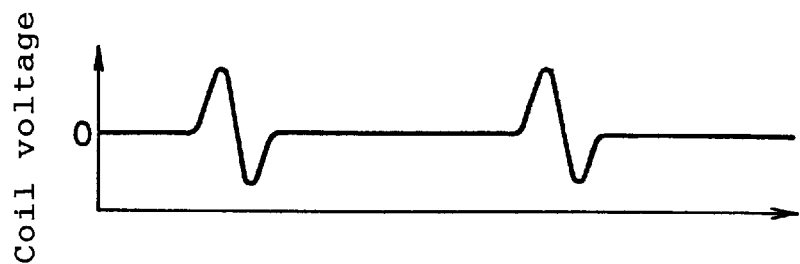
FIGS. 4(a) and 4(b) show coil voltages of a magnetic pickup coil (non-contact measuring mechanism) in the embodiment of FIG. 2.
Figure 4B:
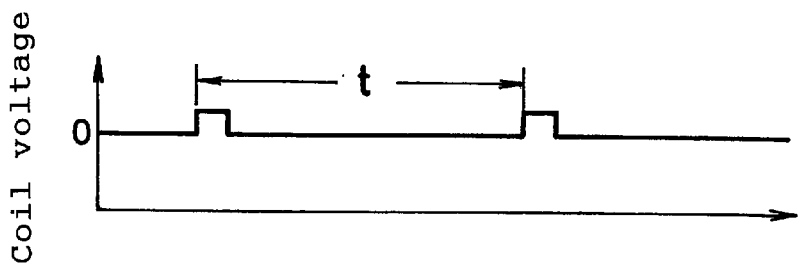

Next, description will be made of an operation of the foregoing hub odometer. Following rotation of the vehicle wheel composed of the dual wheel W including the tires T, the axle hub H is rotated. At this time, the case 2 attached to the axle hub H is rotated associatively therewith. However, the eccentric weight 5 rotably supported with respect to the case 2 maintains its drooped state from the center axis position of the axle hub H, and revolutions are generated in the eccentric weight 5 and the case 2 in a relative relation to each other. Accordingly, since the magnet 7 and the magnetic pickup coil 8 cyclically approach each other, the number of revolutions is measured on the basis of a change in a magnetic force of the magnetic pickup coil 8. For example, a coil voltage of the magnetic pickup coil 8 is changed like that shown in FIG. 4(a). By binarizing the coil voltage based on a predetermined threshold value, rotation of a cycle t is detected like that shown in FIG. 4(b).

Measuring data of the above magnetic pickup coil 8 is temporarily stored in the memory of the main circuit 9. To read the measuring data stored in the memory, an interrogation wave is transmitted from the remote unit. After the receiver 10 receives this interrogation wave, the transmitting circuit is actuated in response to the wave to transmit the measuring data stored in the memory. The transmitted data may contain, in addition to the measuring data, ID for specifying a vehicle or an odometer, data for battery monitoring, and so on.

In the hub odometer of the present invention, since the transponder is provided for transmitting the measuring data of the measuring mechanism, the number of revolutions of the tire loaded to the vehicle can be monitored without going to the axle area. Furthermore, since a radio frequency is used for data transfer, measuring data collection can be secured even if the cover 3 of the hub odometer or the like is soiled. Also, since the obtained measuring data is not a mechanical output but electronic data, the number of tire revolutions can be automatically converted into a traveling distance. As the measuring data can contain a vehicle ID or the like, data processing corresponding to the vehicle can be facilitated.

Furthermore, in the hub odometer of the present invention, since the non-contact measuring mechanism is employed for measuring their number of revolutions, a traveling distance can be accurately measured irrespective of a rotational direction of the vehicle wheel. In other words, since the number of revolutions is measured whether the vehicle wheel is rotated forward or backward, a traveling distance is prevented from being reduced by backward rotations unlike the case of the conventional mechanical odometer. Accordingly, highly reliable data can be obtained. In addition, with use of the non-contact measuring mechanism, the hub odometer of the present invention provides higher durability compared with the conventional mechanical odometer.

Figure 5:
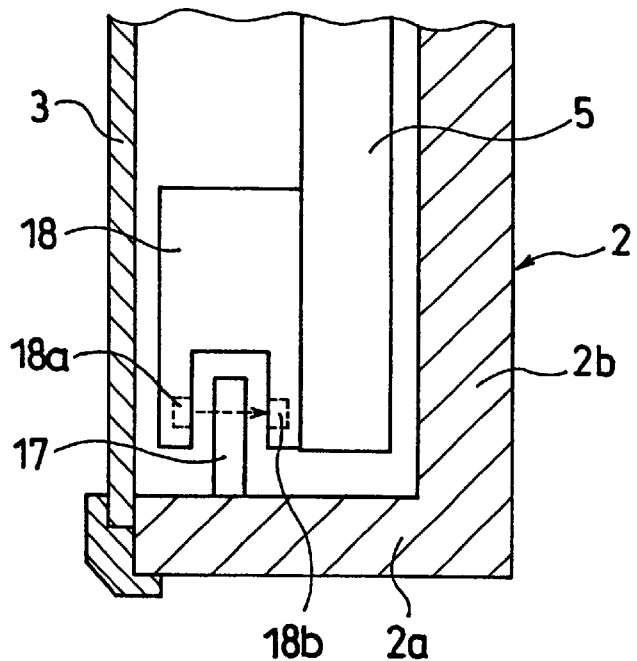
FIG. 5 is a sectional view showing a modified example of a non-contact measuring mechanism.

In accordance with the present invention, as shown in FIG. 5, the non-contact measuring mechanism may be composed of a light shielding plate 17 attached to the inner peripheral surface of the case 2, and a sensor unit 18 attached to the eccentric weight 5. This sensor unit 18 includes a projecting source (projecting section) 18a and an optical sensor (light receiving section) 18b, which are provided in both sides of the light shielding plate 17. The number of revolutions is measured for each passing of the light shielding plate 17 between the projecting source 18a and the optical sensor 18b. Also in this case, a traveling distance can be accurately measured irrespective of a rotational direction of the vehicle wheel.

However, the non-contact measuring mechanism should not be limited to ones described above with reference to the embodiment and the modified example. Various types can be used as long as they are non-contact. For example, a reflector may be attached to a part of the inner peripheral surface of the case, while the projecting source and the optical sensor are attached to the eccentric weight. Then, by reflecting a light emitted from the projecting source on the reflector and by receiving the same by the optical sensor, the number of revolutions may be measured. Also, a metallic piece for detection may be attached to the inner peripheral surface of the case, and the eccentric weight may include a proximity sensor attached thereto to detect changes in a resonance frequency.

Furthermore, the hub odometer of the invention may be provided with a plurality of non-contact measuring mechanisms, and measuring positions of these measuring mechanisms may be shifted from each other in a hub circumferential direction. For example, as shown in FIGS. 6 and 7, the hub odometer may comprise a measuring mechanism including a magnet 7 and a magnetic pickup coil 8a and a measuring mechanism including a magnet 7 and a magnetic pickup coil 8b. These two sets of the measuring mechanisms are disposed such that rotational phases can be shifted from each other.

If the two sets of measuring mechanism are disposed while being shifted from each other as described above, then coil voltages of the coils 8a and 8b will be like those shown in FIGS. 8(a) and 8(b): FIG. 8(a) showing voltages during rotation of an R direction, and FIG. 8(b) voltages during rotation of an L direction. Accordingly, since a rotational direction of the vehicle wheel can be specified on the basis of a difference between both wave forms, data management correlating the rotational direction with a traveling distance can be performed. For example, if the vehicle travels forward by 10 km and backward by 2 km, then not only a traveling distance of 12 km can be measured but also data of forward traveling of 10 km and backward traveling of 2 km can be obtained.

As apparent from the foregoing, in accordance with the present invention, a traveling distance can be accurately measured irrespective of a rotational direction of the vehicle wheel, and data management can be facilitated. Thus, use of the hub odometer of the invention enables a traveling distance of a trailer, an industrial vehicle or the like to be easily and accurately managed.

Although the preferred embodiment of the present invention has been described in detail, it should be understood that various changes, substitutions and alternations can be made therein without departing from spirit and scope of the inventions as defined by the appended claims.

What is claimed is:

1. A hub odometer comprising:

an eccentric weight rotably supported in a center axis position of an axle hub;

a case attached to the axle hub to surround the eccentric weight;

a plurality of non-contact measuring mechanisms disposed to measure a number of revolutions in a relative relation to the case and the eccentric weight; and a transponder operative within a range of radio wave frequencies and including a memory for storing measuring data of the plurality of measuring mechanisms, a transmitting circuit for transmitting the data stored in the memory, and a receiver for receiving an interrogation wave from a remote unit, the transmitting circuit being actuated on the basis of the interrogation wave, wherein measuring positions of the plurality of measuring mechanisms are shifted from each other in a hub circumferential direction and rotational direction of a vehicle wheel is detected based upon the measuring data of the plurality of measuring mechanisms.

2. The hub odometer according to claim 1, wherein said non-contact measuring mechanism is composed of a magnet and a magnetic pickup coil.

3. The hub odometer according to claim 1, wherein said non-contact measuring mechanism is composed of a sensor unit including a projecting source and an optical sensor, and one selected from a light shielding plate and a reflector.

4. The hub odometer according to claim 1, wherein said non-contact measuring mechanism is composed of a proximity sensor for detecting a change in a resonance frequency of a high-frequency magnetic field, and a metallic piece for detection.

* * * * *